(12) United States Patent
Dexheimer et al.

(10) Patent No.: US 6,593,268 B2
(45) Date of Patent: Jul. 15, 2003

(54) ONE-STEP SYNTHESIS OF DOUBLE METAL CYANIDES

(75) Inventors: Edward Michael Dexheimer, Grosse Ile, MI (US); Georg Heinrich Grosch, Bad Dürkheim (DE)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/174,424

(22) Filed: Jun. 18, 2002

(65) Prior Publication Data

US 2002/0193245 A1 Dec. 19, 2002

Related U.S. Application Data

(63) Continuation-in-part of application No. 09/629,692, filed on Aug. 1, 2000, now Pat. No. 6,436,867.

(51) Int. Cl.$^7$ .......................... B01J 27/24; B01J 27/26; B01J 31/06; B01J 31/18
(52) U.S. Cl. ........................................ 502/175; 502/200
(58) Field of Search ................................. 502/175, 200

(56) References Cited

U.S. PATENT DOCUMENTS

| | | |
|---|---|---|
| 4,477,589 A | 10/1984 | van der Hulst et al. |
| 5,470,813 A | 11/1995 | Le-Khac |
| 5,639,705 A | 6/1997 | Bowman et al. |
| 5,693,584 A | 12/1997 | Le-Khac |
| 5,714,639 A | 2/1998 | Bowman et al. |
| 6,436,867 B1 * | 8/2002 | Dexheimer et al. ......... 502/175 |

FOREIGN PATENT DOCUMENTS

| | | |
|---|---|---|
| WO | WO/01/72418 | 10/2001 |

OTHER PUBLICATIONS

PCT Search Report for WO 01/72418, International Publication Date Oct. 4, 2001; International Application No. PT/EP01/03498.

"New Heterogeneous Catalysis for the Synthesis of Poly(ether polyol)s," by J.L. Garcia, E.J. Jang, and H. Alper, Journal of Applied Polymer Science, vol. 86, pp. 1553–1557 (2002). No month.

* cited by examiner

Primary Examiner—Elizabeth D. Wood
(74) Attorney, Agent, or Firm—Fernando A. Borrego

(57) ABSTRACT

Improved methods for synthesizing double metal cyanide (DMC) catalysts are disclosed. These methods combine an aqueous solution of a first metal salt, such as $ZnCl_2$, with an aqueous solution of a second metal salt, such as $CoCl_2$, and with an aqueous solution of an alkali metal cyanide, such as KCN, in different manners to synthesize DMC catalysts, such as $Zn_3[Co(CN)_6]_2$.

50 Claims, No Drawings

ONE-STEP SYNTHESIS OF DOUBLE METAL CYANIDES

RELATED APPLICATIONS

This application is a continuation-in-part of U.S. patent application Ser. No. 09/629,692, filed on Aug. 1, 2000 and now U.S. Pat. No. 6,436,867.

FIELD OF THE INVENTION

The subject invention generally relates to methods of synthesizing a double metal cyanide (DMC) catalyst.

BACKGROUND OF THE INVENTION

Polyether polyols are integral intermediate components utilized to manufacture a wide array of products, including polyurethanes. As such, the production of polyether polyols is critical. It is known in the art that polyether polyols are produced from the polymerization of epoxides, such as propylene oxide (PO) and ethylene oxide (EO). It is also known in the art that double metal cyanide (DMC) catalysts are effective catalysts for the polymerization of the epoxides. DMC catalysts produce polyether polyols having narrow molecular weight distributions as well as relatively low unsaturation.

In conventional methods, DMC catalysts are prepared by combining an aqueous solution of a metal salt and an aqueous solution of a complex metal cyanide salt. As a specific example, an aqueous solution of $ZnCl_2$ (excess), as the metal salt, is combined with an aqueous solution of $K_3Co(CN)_6$, as the complex metal cyanide salt. This combination precipitates out the desired DMC catalyst, in this case specifically $Zn_3[Co(CN)_6]_2$. Examples of such conventional methods are disclosed in U.S. Pat. Nos. 5,470,813 and 5,714,639. These conventional methods, in one form or another, utilize a complex metal cyanide salt. The complex metal cyanide salts are very expensive which limits the economic viability of utilizing DMC catalysts in the production of polyether polyols. One reason these complex metal cyanide salts are so expensive is that they are pre-purified. That is, any secondary products, such as KCl, which may have the potential of wholly or partially deactivating the DMC catalysts, are removed from the complex metal cyanide salt before the $ZnCl_2$ is combined with the complex metal cyanide salt.

Thus, it would be desirable to provide methods of synthesizing DMC catalysts that do not utilize expensive complex metal cyanide salts as intermediates thereby improving the economic viability of DMC catalysts utilized in the production of polyether polyols.

SUMMARY OF THE INVENTION

The present invention provides various methods of synthesizing a double metal cyanide (DMC) catalyst. As disclosed above, the methods of the subject invention do not utilize complex metal cyanide salts to synthesize the DMC catalyst.

The method of the subject invention, in a single step, combines an aqueous solution of a first metal salt of the general formula $M(X)_n$ wherein M is selected from the group consisting of aluminum, zinc, and the transition metals; X is an anion selected from the group consisting of halides, hydroxides, sulfates, acetates, carbonates, cyanides, oxalates, thiocyanates, isocyanates, isothiocyanates, carboxylates, and nitrates; and n is a value from 1 to 3 satisfying the valency state of M with an aqueous solution of a second metal salt of the general formula $N(Y)_n$ wherein N is selected from the group consisting of the transition metals and the lanthanides; Y is an anion selected from the group consisting of halides, hydroxides, sulfates, carbonates, cyanides, oxalates, thiocyanates, isocyanates, isothiocyanates, carboxylates, and nitrates; and n is a value from 1 to 3 satisfying the valency state of N; and with an aqueous solution of an alkali metal cyanide to form a suspension having a particle phase and a continuous phase. The particle phase comprises the DMC catalyst synthesized from the combination of the aqueous solutions of the first metal salt, the second metal salt, and the alkali metal cyanide. The continuous phase comprises a secondary product such as KCl. In this method, the DMC catalyst is produced independent of a complex metal cyanide salt.

In an alternative method of synthesizing the DMC catalyst, the aqueous solution of the first metal salt and the aqueous solution of the second metal salt are each independently fed into the aqueous solution of the alkali metal cyanide. In a further alternative method of synthesizing the DMC catalyst, the aqueous solution of the metal salt of the general formula $N(Y)_n$, i.e., the second metal salt, is combined with the aqueous solution of the alkali metal cyanide of the general formula XCN to form an intermediate solution comprising a DMC catalyst precursor and the secondary product. In this method, the aqueous solution of the metal salt of the general formula $M(X)_n$, i.e., the first metal salt, is next combined with the intermediate solution such that the DMC catalyst is synthesized upon reaction between the DMC catalyst precursor and the first metal salt. In either alternative method, the DMC catalyst is produced independent of a complex metal cyanide salt.

DETAILED DESCRIPTION OF A PREFERRED EMBODIMENT

Various methods of synthesizing a double metal cyanide (DMC) catalyst are disclosed. More specifically, the methods of the subject invention synthesize the DMC catalyst by combining aqueous solutions of a first metal salt, a second metal salt, and an alkali metal cyanide in different manners.

An aqueous solution of the first metal salt is prepared. The strength of the aqueous solution of the first metal salt can range from 1 to 50 parts by weight of the first metal salt based on 100 parts by weight of the aqueous solution. Similarly, aqueous solutions of a second metal salt and an alkali metal cyanide are also prepared. The strengths of these aqueous solutions can also range from 1 to 50 parts by weight of the second metal salt and the alkali metal cyanide, respectively, based on 100 parts by weight of the aqueous solution. In any event, it is most preferred that the first metal salt is combined in molar excess relative to the second metal salt. In other words, the molar ratio of the first metal salt to the second metal salt is greater than 1. This molar ratio preferably ranges from 1.1:1 to 6:1, more preferably from 1.1:1 to 3:1.

Additionally, at least one of the aqueous solutions of the first metal salt, the second metal salt, and the alkali metal cyanide further comprise a water-soluble, organic activator. As understood by those skilled in the art, organic activators activate the surface of the DMC catalyst to improve the overall activity of the catalyst. If included, the water-soluble, organic activator preferably comprises at least one of ethanol, isopropyl alcohol, n-butyl alcohol, sec-butyl alcohol, tert-butyl alcohol, isobutyl alcohol, and glyme. Other water-soluble, organic activators are known in the art. The most preferred organic activator for purposes of the subject invention is tert-butyl alcohol. If included, the water-soluble, organic activator is preferably introduced in a washing step as described below.

The first metal salt of the subject invention observes the general formula $M(X)_n$. In this formula, it is to be understood that M is selected from the group consisting of aluminum, zinc, and the transition metals, X is an anion selected from the group consisting of halides, hydroxides, sulfates, acetates, carbonates, cyanides, oxalates, thiocyanates, isocyanates, isothiocyanates, carboxylates, and nitrates, and n is a value from 1 to 3 satisfying the valency state of M. In preferred embodiments of the subject invention, M is selected from the group consisting of Al(III) and Zn(II), X selected from the group consisting of halides and acetates, and n is a value from 1 to 3 satisfying the valency state of M. The first metal salt of the subject invention may comprise at least one of zinc acetate and aluminum acetate. Most preferably, however, the first metal salt of the subject invention is $ZnCl_2$.

The second metal salt of the subject invention observes the general formula $N(Y)_n$. In this formula, it is to be understood that N is selected from the group consisting of the transition metals and the lanthanides, Y is an anion selected from the group consisting of halides, hydroxides, sulfates, carbonates, cyanides, oxalates, thiocyanates, isocyanates, isothiocyanates, carboxylates, and nitrates, and n is a value from 1 to 3 satisfying the valency state of N. In preferred embodiments of the subject invention, N is selected from the group consisting of the Fe(II), Fe(III), Co(II), Co(III), Nd(III), Y is selected from the group consisting of halides, and n is a value from 1 to 3 satisfying the valency state of N. The second metal salt may comprise neodymium chloride. However, it is most preferred that the second metal salt is $CoCl_2$.

It is to be understood that Group IA alkali metals may be utilized for the alkali metal cyanide of the subject invention. Preferably, the alkali metal cyanide utilized is KCN. However, it is to be understood that other alkali metal cyanides, such as LiCN and NaCN, may be utilized without varying the scope of the subject invention.

In one embodiment, all three aqueous solutions can be combined in a single step. That is, the aqueous solutions of $M(X)_n$, $N(Y)_n$, and the alkali metal cyanide can be combined, in independent feed streams, into a reaction vessel, which is originally empty. As will be understood from that described below, the methods for synthesizing the DMC catalyst according to the subject invention are flexible, i.e., robust, and the order of addition or the time of addition (e.g. simultaneous or separate) is not critical.

In another embodiment, the method of the subject invention first combines the aqueous solution of $M(X)_n$ and the aqueous solution of $N(Y)_n$ to establish a first aqueous solution. The first aqueous solution may, for example, be formed in a pre-mix vessel. The first aqueous solution, including the aqueous solutions of both the first metal salt, $M(X)_n$, and the second metal salt, $N(Y)_n$, is then combined with the aqueous solution of the alkali metal cyanide, such as an aqueous solution of KCN, to form a combination product, i.e., the DMC catalyst.

The first aqueous solution, preferably from the pre-mix vessel, may be combined with the aqueous solution of the alkali metal cyanide in different manners. For instance, the aqueous solution of the alkali metal cyanide may be prepared in the reaction vessel, and the first aqueous solution from the pre-mix vessel may be added to the reaction vessel. Alternatively, the aqueous solution of the alkali metal cyanide may be added to the first aqueous solution in the pre-mix vessel. Alternatively, the reaction vessel may initially be empty, and the first aqueous solution and the aqueous solution of the alkali metal cyanide may be combined, or added, into the reaction vessel at the same time but via separate feed streams.

In yet another embodiment, the aqueous solution of the first metal salt and the aqueous solution of the second metal salt are each independently fed into the aqueous solution of the alkali metal cyanide in a single step to synthesize the DMC catalyst. That is, in this embodiment, the aqueous solution of the alkali metal cyanide is in the reaction vessel, and the aqueous solutions of the first and second metal salts are not first combined. Instead, each of these aqueous solutions remains separate, i.e., not pre-mixed, and they are independently fed into the aqueous solution of the alkali metal cyanide.

In yet another method of the subject invention, the aqueous solution of the metal salt of the general formula $N(Y)_n$, i.e., the second metal salt, is combined with an aqueous solution of the alkali metal cyanide. As understood by those skilled in the art, the alkali metal cyanide has the general formula XCN, wherein X is selected from the group consisting of alkali metals. For example, an aqueous solution of $CoCl_2$ is combined with an aqueous solution of KCN. The combination of the aqueous solution of the second metal salt with the aqueous solution of the alkali metal cyanide forms an intermediate solution. This intermediate solution comprises a DMC catalyst precursor and a secondary product. The secondary product is of the general formula $X_nY$, wherein n is a value from 1 to 3 that satisfies the valency state of Y.

In the example set forth immediately above, the DMC catalyst precursor is a complex comprising at least cobalt atoms, originally from the $CoCl_2$, and cyanide (CN) anion, originally from the KCN, and the secondary product comprises KCl. In addition, it is also possible that the DMC catalyst precursor comprise potassium (K) ion.

It is to be understood that the secondary product is intended to describe any compound that, in any way, wholly or partially deactivates the DMC catalyst. Therefore, as understood by those skilled in the art, it is preferred, but not necessary, to substantially eliminate the secondary product from the combination product of the aqueous solutions of the first metal salt, the second metal salt, and the alkali metal cyanide such that the DMC catalyst is not deactivated.

Next, an aqueous solution of a metal salt of the general formula $M(X)_n$, i.e., the first metal salt, is combined with the intermediate solution formed as described above such that the DMC catalyst is synthesized upon reaction between the DMC catalyst precursor and the first metal salt.

In any of the embodiments described above, the combination of all of the aqueous solutions forms a suspension having a particle phase and a continuous phase. The particle phase comprises the DMC catalyst synthesized from the combination of the aqueous solutions of the first metal salt, the second metal salt, and the alkali metal cyanide, and the continuous phase comprises the secondary product.

For the purpose of eliminating the secondary product and isolating the DMC catalyst, the particle phase is separated from the continuous phase. Separating the particle phase from the continuous phase helps to ensure that the DMC catalyst is not deactivated in any way by the secondary product. Separating the particle phase from the continuous phase can be accomplished by various techniques. Once the particle phase is separated from the continuous phase, the particle phase can be washed with the water-soluble, organic activator.

One such technique is to filter the suspension to collect the particle phase, which comprises the DMC catalyst, as a retentate or residual product. After the particle phase is collected as the retentate, the retentate is preferably dried. The preferred manner in which to dry the retentate is by air-drying. However, in any of the embodiments described herein various forms of heat may be used to dry the retentate. In this technique, although not necessary, the retentate may be triturated or washed with the water-soluble, organic activator prior to drying. In other words, the suspension can be filtered and then dried, without triturating or washing, or the suspension can be filtered, triturated or washed, and then dried. As understood by those skilled in the art trituration is essentially a washing step that also incorporates some form of agitation, such as mixing, and washing does not typically incorporate any form of agitation.

Another technique for separating the particle phase from the continuous phase is to hold the suspension until the continuous phase at least partially separates from the particle phase. In other words, the suspension is held until the particle phase settles to the bottom of the reaction vessel such that the continuous phase is on top of the particle phase. It is preferred to hold the suspension until the continuous phase almost entirely separates from the particle phase. To accomplish this, the suspension is held for from 0.5 to 24, preferably from 1 to 12, hours.

After the suspension has been held, this technique further includes the step of decanting the continuous phase. That is, the continuous phase, which after the holding step is on top, is poured off of or removed from the particle phase. Although not required, this technique may continue by centrifuging the particle phase to separate liquid from the particle phase after the continuous phase has been decanted. As understood by those skilled in the art, the centrifugation step further separates remnants of any liquid from the particle phase. If the particle phase is centrifuged, then the liquid generated in the centrifugation step is decanted. This technique may continue by washing the particle phase with the water-soluble, organic activator after the liquid has been decanted. The different water-soluble, organic activators are as described above with the most preferred being tert-butyl alcohol. Of course, if the particle phase is now washed with the water-soluble, organic activator, then the particle phase is dried after the washing step.

The following examples illustrate the nature of the subject method invention with regard to the methods of synthesizing the DMC catalyst. The examples presented herein are intended to demonstrate the objects of the invention but should not be considered as limitations thereto.

EXAMPLES

The method synthesizes the DMC catalyst according to the following chemical equation:

$$3ZnCl_2 + 2CoCl_2 + 12KCN \rightarrow Zn_3[Co(CN)_6]_2$$

The aqueous solution of the first metal salt, $ZnCl_2$, is combined with the aqueous solution of the second metal salt, $CoCl_2$, and with the aqueous solution of the alkali metal cyanide, KCN, in a single step to synthesize the DMC catalyst, $Zn_3[Co(CN)_6]_2$. There is a molar excess of $ZnCl_2$, the first metal salt, relative to $CoCl_2$, the second metal salt.

Although not shown, KCl is produced as a secondary product according to the above chemical equation. It is understood that KCl may deactivate the DMC catalyst such that the DMC catalyst becomes ineffective in polymerizing epoxides, such as PO, to produce a polyether polyol. As such, although not absolutely necessary, it is preferred that any amounts of the secondary product KCl remaining in the DMC catalyst are minimized, if not completely eliminated, through the various techniques described above.

In a second example, the method synthesizes an alternative DMC catalyst in a single step according to the following chemical equation:

$$3ZnCl_2 + 2FeCl_3 + 12KCN \rightarrow Zn_3[Fe(CN)_6]_2$$

The aqueous solution of the first metal salt, $ZnCl_2$, is combined with the aqueous solution of the second metal salt, $FeCl_3$, and with the aqueous solution of the alkali metal cyanide, KCN, in a single step to synthesize the DMC catalyst, $Zn_3[Fe(CN)_6]_2$. There is a molar excess of $ZnCl_2$, the first metal salt, relative to $FeCl_3$, the second metal salt. The above discussion regarding the secondary product KCl also applies in this example.

More specifically, in this example, an aqueous solution of the first metal salt was prepared with 0.45 g $ZnCl_2$ and 10.0 g $H_2O$. An aqueous solution of the second metal salt was prepared with 0.54 g $FeCl_3.6H_2O$, and an aqueous solution of the alkali metal cyanide was prepared with 0.78 g KCN and 20 g $H_2O$ and 1.0 g tert-butyl alcohol. Next, the aqueous solution of $ZnCl_2$ was combined with the aqueous solution of $FeCl_3.6H_2O$ to establish the first aqueous solution of the subject invention. The first aqueous solution was then combined with the aqueous solution of KCN to complete the synthesis of the combination product $Zn_3[Fe(CN)_6]_2$.

Procedure to Extract the DMC Catalyst $Zn_3[Fe(CN)_6]_2$

The combination of the first aqueous solution with the aqueous solution of KCN resulted in the immediate formation of the combination of a black precipitate in suspension. The suspension, including the black precipitate, was filtered, and triturated with a solution of 5.0 g $H_2O$ and 5.0 g tert-butyl alcohol, and then filtered again to collect a residual product. The residual product was then transferred to a beaker and allowed to air-dry. The resulting combination product of $Zn_3[Fe(CN)_6]_2$ weighed 0.42 g.

In a third example, a solution of 15.62 g (0.24 mole) of KCN in 250 ml $H_2O$ was poured into a WARING blender. Under rapid mixing, a solution of 9.54 g (0.07 mole) of $ZnCl_2$ and 14.34 g (0.04 mole) $NdCl_3.6H_2O$ (neodymium chloride hexahydrate) in 100 ml $H_2O$ was poured slowly into the KCN solution. A suspension formed. The suspension was transferred to a beaker and 50 ml of tert-butyl alcohol was added to the suspension.

After holding for 3 hours, the particle phase settled to the bottom of the beaker and the continuous phase was on top of the particle phase. The continuous phase was decanted. More specifically, the top 150 ml was decanted. The lower 250 ml, which is an opaque suspension that is light blue in color and which is primarily the particle phase, was centrifuged. After the centrifuging step, the remaining liquid was decanted and the remaining particle phase was washed in a solution of 100 ml $H_2O$ and 100 ml tert-butyl alcohol. The centrifuging step was repeated. The remaining particle phase, which comprises the DMC catalyst, was transferred to a crystallizing dish to air-dry. The dry product, i.e., the DMC catalyst, of this example weighed 5.65 g, and X-ray diffraction analysis conducted by techniques known in the art indicated that the product contained 3% Cl, 0.3% K, 30% Nd, and 30% Zn.

In a fourth example, a solution of 7.81 g (0.12 mole) of KCN in 150 ml $H_2O$ was poured into a 400 ml beaker under magnetic stirring. Under rapid mixing, a solution of 4.09 g (0.03 mole) of $ZnCl_2$ and 4.76 g (0.02 mole) $CoCl_2.6H_2O$ (cobalt chloride hexahydrate) in 100 ml $H_2O$ was poured slowly into the KCN solution. A suspension formed. An additional 1.76 g (0.013 mole) $ZnCl_2$ was then added to the suspension. The suspension was then treated with 2.0 g of 30% $H_2O_2$ at 70° C. for 2.5 hours. Although not required, the $H_2O_2$ functions as an oxidizing agent to advance the reaction. The color of the suspension changed from red to tan. The suspension was cooled to 40° C. and 200 ml of tert-butyl alcohol was added. After a 2 hour hold, the particle phase settled to the bottom of the beaker and the continuous phase was on top of the particle phase. The continuous phase, clear and yellow in color, was decanted. More specifically, the top 200 ml was decanted. After decantation, the remaining particle phase was triturated with a solution of 150 ml $H_2O$ and 150 ml tert-butyl alcohol and then held for 2 hours. This new continuous phase, resulting primarily from the 150 ml $H_2O$/150 ml tert-butyl alcohol solution, was decanted leaving approximately 150 ml of the particle phase, at this point a dispersion in form, i.e., still wet. The dispersion was then diluted with 100 g tert-butyl alcohol and 200 g $H_2O$ and transferred to a separatory funnel. After holding for approximately 16 hours, this new continuous phase, resulting primarily from the 100 g $H_2O$/200 g tert-butyl alcohol solution, was decanted, and the remaining particle phase, approximately 50 g, which comprises the DMC catalyst was transferred to a shallow pan to air-dry. The dry product, i.e., the DMC catalyst, of this example weighed 6.17 g and was light brown in color.

In a fifth example, a solution of 78.12 g (1.20 mole) of KCN in 1400 ml $H_2O$ was poured into a 3 L flask under mechanical stirring. Under rapid mixing, a solution of 81.78 g (0.60 mole) of $ZnCl_2$ and 47.58 g (0.20 mole) $CoCl_2.6H_2O$ (cobalt chloride hexahydrate) in 100 ml $H_2O$ was poured slowly into the KCN solution. A suspension formed. The suspension was then treated with 32.3 g (0.30 mole) $H_2O_2$ in 400 ml H2O at 70° C. for 2.5 hours. The color of the suspension changed from red to brown. The suspension was then refluxed for 4 hours, then cooled to 40° C., and then 200 ml of tert-butyl alcohol was added. After a 0.5 hour hold, the suspension was filtered through a glass frit under 500 mm Hg vacuum. The remaining particle phase was then transferred to a shallow pan to air-dry. The dry product, i.e., the DMC catalyst, of this example weighed 78.38 g and was tan in color.

In a sixth example, a first solution was prepared. The first solution included 1.0 g (0.0046 mole) of zinc acetate dihydrate and 0.361 g (0.0015 mole) of cobalt chloride hexahydrate in 10 ml DI $H_2O$. A second solution was prepared. The second solution included 0.593 g (0.0091 mole) of KCN in 10 ml DI $H_2O$. The first solution was added, in a dropwise manner, to the second solution over 10 minutes at 75° C. while stirring the mixture of the two solutions manually. A suspension formed and was filtered, washed with $H_2O$, and air-dried for approximately 16 hours in an oven at 65° C. The dry product, i.e., the DMC catalyst, of this example weighed 0.68 g.

In a seventh example, a first solution was prepared. The first solution included 1.0 g (0.0071 mole) of aluminum acetate (stabilized with boric acid) and 0.102 g (0.0004 mole) of cobalt chloride hexahydrate in 10 ml DI $H_2O$. A second solution was prepared. The second solution included 0.166 g (0.0025 mole) of KCN in 10 ml DI $H_2O$. The first solution was added, in a dropwise manner, to the second solution over 10 minutes at 75° C. while stirring the mixture of the two solutions manually. A suspension formed and was filtered, washed with $H_2O$, and air-dried for approximately 16 hours in an oven at 65° C. The resulting IR spectrum of the dry product, i.e., the DMC catalyst, was consistent with the structure $Al_4[Co(CN)_6]_3.Al(OAc)_3$.

In an eighth example, a solution of 78.12 g (1.20 mole) of KCN and 32.2 g (0.3 mole) 31% aqueous $H_2O_2$ in 1000 ml $H_2O$ was prepared in a 3 L flask under mechanical stirring. A solution of 47.58 g (0.20 mole) $CoCl_2.6H_2O$ (cobalt chloride hexahydrate) in 150 ml $H_2O$ was charged to an addition funnel. A 20 ml aliquot (10%) of the $CoCl_2$ solution was added, in a dropwise manner, to the KCN solution. Next, one-third of a solution of 81.78 g (0.60 mole) $ZnCl_2$ in 200 ml $H_2O$ was added to the additional funnel and stirred. The combined solution in the addition funnel was added to the $KCN/CoCl_2$ solution in a rapid, dropwise manner. Stirring was continued for 0.5 hour after addition of the combined solution from the addition funnel was complete. The remaining $ZnCl_2$ solution was charged to the addition funnel and then the combined solution in the additional funnel was added in a rapid, dropwise manner. A suspension formed. After a holding step of approximately 16 hours, the continuous phase was decanted, and the particle phase was filtered. The retentate was re-dispersed in 1 L $H_2O$ and filtered again. This retentate was then re-dispersed in 300 ml $H_2O$ and 200 ml tert-butyl and filtered again. This retentate was air dried and yielded 82.70 g of the DMC catalyst.

In a ninth example, a solution of 78.12 g (1.20 mole) of KCN and 32.2 g (0.3 mole) 31% aqueous $H_2O_2$ in 1000 ml $H_2O$ was prepared in a 3 L flask under mechanical stirring. A solution of 47.58 g (0.20 mole) $CoCl_2.16H_2O$ (cobalt chloride hexahydrate) in 200 ml $H_2O$ was charged to an addition funnel. A 220 ml aliquot (90%) of the $CoCl_2$ solution was added, in a dropwise manner, to the KCN solution. Next, a solution of 81.78 g (0.60 mole) $ZnCl_2$ in 200 ml $H_2O$ was added to the additional funnel and stirred. The combined solution in the addition funnel was added to the $KCN/CoCl_2$ solution in a rapid, dropwise manner. The reaction mixture was heated at 60° C. and stirred for 2 hours after addition of the combined solution from the addition funnel was complete. A suspension formed. After a holding step of approximately 16 hours, the suspension was filtered. The retentate was re-dispersed in 1 L $H_2O$ and 100 ml tert-butyl and filtered again. This retentate was then re-dispersed in a solution of 1.0 g cholic acid sodium salt, 500 ml $H_2O$, and 300 ml tert-butyl alcohol and filtered again. The retentate from this filtering step was air dried and yielded 82.70 g of the DMC catalyst.

In a tenth example, a solution of 78.12 g (1.20 mole) of KCN in 1500 ml $H_2O$ was prepared in a 3 L flask under mechanical stirring. A solution of 47.58 g (0.20 mole) $CoCl_2.6H_2O$ (cobalt chloride hexahydrate) and 27.26 g (0.20 mole) $ZnCl_2$ in 200 ml $H_2O$ was charged to an addition funnel and added in a dropwise manner to the KCN solution. The reaction mixture was heated at 90° C. A solution of 54.52 g (0.40 mole) $ZnCl_2$ in 150 ml $H_2O$ was then added to the reaction mixture in a rapid, dropwise manner. The reaction mixture was heated at 90° C. and stirred for 2 hours after addition of the $ZnCl_2$ solution was complete. A suspension formed. After a holding step of approximately 16 hours, the suspension was filtered. The retentate was re-dispersed in a solution of 1.0 g cholic acid sodium salt, 800 ml $H_2O$, and 200 ml tert-butyl alcohol and filtered again. This retentate was re-dispersed in a solution of 300 ml $H_2O$ and 600 ml tert-butyl alcohol. The retentate from this filtering step was air dried and yielded 77.36 g of the DMC catalyst.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method of synthesizing a double metal cyanide (DMC) catalyst, said method comprising the step of:
    combining an aqueous solution of a first metal salt of the general formula $M(X)_n$ wherein;
        M is selected from the group consisting of aluminum, zinc, and the transition metals,
        X is an anion selected from the group consisting of halides, hydroxides, sulfates, acetates, carbonates, cyanides, oxalates, thiocyanates, isocyanates, isothiocyanates, carboxylates, and nitrates, and
        n is a value from 1 to 3 satisfying the valency state of M;
    with an aqueous solution of a second metal salt of the general formula $N(Y)_n$ wherein;
        N is selected from the group consisting of the transition metals and the lanthanides,
        Y is an anion selected from the group consisting of halides, hydroxides, sulfates, carbonates, cyanides, oxalates, thiocyanates, isocyanates, isothiocyanates, carboxylates, and nitrates, and
        n is a value from 1 to 3 satisfying the valency state of N; and
    with an aqueous solution of an alkali metal cyanide in a single step to form a suspension having a particle phase and a continuous phase wherein the particle phase comprises the DMC catalyst synthesized from the combination of the aqueous solutions of the first metal salt, the second metal salt, and the alkali metal cyanide, and the continuous phase comprises a secondary product.

2. A method as set forth in claim 1 further comprising the step of separating the particle phase from the continuous phase.

3. A method as set forth in claim 2 wherein the step of separating the particle phase from the continuous phase comprises the step of filtering the suspension to collect the particle phase comprising the DMC catalyst as a retentate.

4. A method as set forth in claim 3 further comprising the step of washing the particle phase with a water-soluble, organic activator after the liquid has been decanted.

5. A method as set forth in claim 4 wherein the water-soluble, organic activator comprises at least one of ethanol, isopropyl alcohol, n-butyl alcohol, sec-butyl alcohol, tert-butyl alcohol, isobutyl alcohol, and glyme.

6. A method as set forth in claim 3 wherein the step of separating the particle phase from the continuous phase further comprises the step of drying the retentate.

7. A method as set forth in claim 2 wherein the step of separating the particle phase from the continuous phase comprises the step of holding the suspension until the continuous phase at least partially separates from the particle phase.

8. A method as set forth in claim 7 wherein the step of holding the suspension is further defined as holding the suspension for from 0.5 to 24 hours.

9. A method as set forth in claim 7 wherein the step of separating the particle phase from the continuous phase comprises the step of decanting the continuous phase after the suspension has been held.

10. A method as set forth in claim 9 wherein the step of separating the particle phase from the continuous phase further comprises the step of centrifuging the particle phase to separate liquid from the particle phase after the continuous phase has been decanted.

11. A method as set forth in claim 10 wherein the step of separating the particle phase from the continuous phase further comprises the step of decanting the liquid after the particle phase has been centrifuged.

12. A method as set forth in claim 11 wherein the step of separating the particle phase from the continuous phase further comprises the step of washing the particle phase with a water-soluble, organic activator after the liquid has been decanted.

13. A method as set forth in claim 12 wherein the water-soluble, organic activator comprises at least one of ethanol, isopropyl alcohol, n-butyl alcohol, sec-butyl alcohol, tert-butyl alcohol, isobutyl alcohol, and glyme.

14. A method as set forth in claim 12 wherein the step of separating the particle phase from the continuous phase further comprises the step of drying the particle phase after the particle phase has been washed with the water-soluble, organic activator.

15. A method as set forth in claim 1 wherein at least one of the aqueous solutions of the first metal salt, the second metal salt, and the alkali metal cyanide further comprise a water-soluble, organic activator.

16. A method as set forth in claim 1 wherein the first metal salt is combined in molar excess relative to the second metal salt.

17. A method as set forth in claim 1 wherein the secondary product comprises KCl.

18. A method of synthesizing a double metal cyanide (DMC) catalyst, said method comprising the step of:
    combining an aqueous solution of a first metal salt of the general formula $M(X)_n$ wherein;
        M is selected from the group consisting of aluminum, zinc, and the transition metals,
        X is an anion selected from the group consisting of halides, hydroxides, sulfates, acetates, carbonates, cyanides, oxalates, thiocyanates, isocyanates, isothiocyanates, carboxylates, and nitrates, and
        n is a value from 1 to 3 satisfying the valency state of M;
    with an aqueous solution of a second metal salt of the general formula $N(Y)_n$ wherein;
        N is selected from the group consisting of the transition metals and the lanthanides,
        Y is an anion selected from the group consisting of halides, hydroxides, sulfates, carbonates, cyanides, oxalates, thiocyanates, isocyanates, isothiocyanates, carboxylates, and nitrates, and
        n is a value from 1 to 3 satisfying the valency state of N; and
    with an aqueous solution of an alkali metal cyanide in a single step to synthesize the DMC catalyst.

19. A method as set forth in claim 17 wherein the first metal salt comprises at least one of zinc acetate and aluminum acetate.

20. A method as set forth in claim 17 wherein the second metal salt comprises neodymium chloride.

21. A method as set forth in claim 17 wherein the first metal salt is combined in molar excess relative to the second metal salt.

22. A method as set forth in claim 20 wherein the molar ratio of the first metal salt to the second metal salt is from 1.1:1 to 6:1.

23. A method of synthesizing a double metal cyanide (DMC) catalyst, said method comprising the step of:
   combining an aqueous solution of a first metal salt of the general formula $M(X)_n$ wherein;
      M is selected from the group consisting of aluminum, zinc, and the transition metals,
      X is an anion selected from the group consisting of halides, hydroxides, sulfates, acetates, carbonates, cyanides, oxalates, thiocyanates, isocyanates, isothiocyanates, carboxylates, and nitrates, and
      n is a value from 1 to 3 satisfying the valency state of M;
   with an aqueous solution of a second metal salt of the general formula $N(Y)_n$ wherein;
      N is selected from the group consisting of the transition metals and the lanthanides,
      Y is an anion selected from the group consisting of halides, hydroxides, sulfates, carbonates, cyanides, oxalates, thiocyanates, isocyanates, isothiocyanates, carboxylates, and nitrates, and
      n is a value from 1 to 3 satisfying the valency state of N; and
   with an aqueous solution of an alkali metal cyanide in a single step to synthesize the DMC catalyst,
   wherein the aqueous solution of the first metal salt and the aqueous solution of the second metal salt are each independently fed into the aqueous solution of the alkali metal cyanide.

24. A method as set forth in claim 23 wherein M is selected from the group consisting of Al(III) and Zn(II).

25. A method as set forth in claim 23 wherein X is selected from the group consisting of halides and acetates.

26. A method as set forth in claim 23 wherein N is selected from the group consisting of Fe(II), Fe(III), Co(II), Co(III), Nd(III).

27. A method as set forth in claim 23 wherein Y is selected from the group consisting of halides.

28. A method as set forth in claim 23 wherein the alkali metal cyanide is selected from the group consisting of LiCN, NaCN, and KCN.

29. A method as set forth in claim 23 wherein the first metal salt is $ZnCl_2$, the second metal salt is $CoCl_2$, and the alkali metal cyanide is KCN.

30. A method as set forth in claim 23 wherein the step of combining the aqueous solutions of the first metal salt, the second metal salt, and the alkali metal cyanide further comprises the step of forming a suspension having a particle phase and a continuous phase wherein the particle phase comprises the DMC catalyst synthesized from the combination of the aqueous solutions of the first metal salt, the second metal salt, and the alkali metal cyanide, and the continuous phase comprises a secondary product.

31. A method as set forth in claim 30 wherein the secondary product comprises KCl.

32. A method as set forth in claim 30 further comprising the step of separating the particle phase from the continuous phase.

33. A method as set forth in claim 32 further comprising the step of washing the particle phase with a water-soluble, organic activator.

34. A method as set forth in claim 33 wherein the step of washing the particle phase with the water-soluble, organic activator occurs after the particle phase has been separated from the continuous phase.

35. A method as set forth in claim 23 wherein at least one of the aqueous solutions of the first metal salt, the second metal salt, and the alkali metal cyanide further comprise a water-soluble, organic activator.

36. A method as set forth in claim 23 wherein the first metal salt is combined in molar excess relative to the second metal salt.

37. A method of synthesizing a double metal cyanide (DMC) catalyst, said method comprising the steps of:
   (A) combining an aqueous solution of a metal salt of the general formula $N(Y)_n$ wherein;
      N is selected from the group consisting of the transition metals and the lanthanides,
      Y is an anion selected from the group consisting of halides, hydroxides, sulfates, carbonates, cyanides, oxalates, thiocyanates, isocyanates, isothiocyanates, carboxylates, and nitrates, and
      n is a value from 1 to 3 satisfying the valency state of N;
   with an aqueous solution of an alkali metal cyanide of the general formula XCN wherein;
      X is selected from the group consisting of alkali metals, and
   to form an intermediate solution comprising a DMC catalyst precursor and a secondary product of the general formula $X_nY$, wherein n is a value from 1 to 3 satisfying the valency state of Y; and
   (B) combining an aqueous solution of a metal salt of the general formula $M(X)_n$ wherein;
      M is selected from the group consisting of aluminum, zinc, and the transition metals,
      X is an anion selected from the group consisting of halides, hydroxides, sulfates, acetates, carbonates, cyanides, oxalates, thiocyanates, isocyanates, isothiocyanates, carboxylates, and nitrates, and
      n is a value from 1 to 3 satisfying the valency state of M;
   with the intermediate solution such that the DMC catalyst is synthesized upon reaction between the DMC catalyst precursor and the metal salt of the general formula $M(X)_n$.

38. A method as set forth in claim 37 wherein M is selected from the group consisting of Al(III) and Zn(II).

39. A method as set forth in claim 37 wherein X is selected from the group consisting of halides and acetates.

40. A method as set forth in claim 37 wherein N is selected from the group consisting of Fe(II), Fe(III), Co(II), Co(III), Nd(III).

41. A method as set forth in claim 37 wherein Y is selected from the group consisting of halides.

42. A method as set forth in claim 37 wherein the alkali metal cyanide is selected from the group consisting of LiCN, NaCN, and KCN.

43. A method as set forth in claim 37 wherein the metal salt of the general formula $N(Y)_n$ is $CoCl_2$, the alkali metal cyanide is KCN, and the metal salt of the general formula $M(X)_n$ is $ZnCl_2$.

44. A method as set forth in claim 37 wherein the secondary product comprises KCl.

45. A method as set forth in claim 37 further comprising the step of forming a suspension having a particle phase and a continuous phase after step (B), wherein the particle phase comprises the DMC catalyst synthesized from the combination of the aqueous solution of the metal salt of the general formula $M(X)_n$ with the intermediate solution, and the continuous phase comprises a secondary product.

46. A method as set forth in claim 45 further comprising the step of separating the particle phase from the continuous phase.

47. A method as set forth in claim 46 further comprising the step of washing the particle phase with a water-soluble, organic activator.

48. A method as set forth in claim 47 wherein the step of washing the particle phase with the water-soluble, organic activator occurs after the particle phase has been separated from the continuous phase.

49. A method as set forth in claim 37 wherein at least one of the aqueous solutions of the metal salt of the general formula $N(Y)_n$, the alkali metal cyanide, and the metal salt of the general formula $M(X)_n$ further comprise a water-soluble, organic activator.

50. A method as set forth in claim 37 wherein the molar ratio of the metal salt of the general formula $M(X)_n$ to the metal salt of the general formula $N(Y)_n$ is greater than 1.

* * * * *